June 30, 1942.  A. CLAUD-MANTLE  2,287,783
ASSIST CORD ASSEMBLY
Filed May 12, 1941  3 Sheets-Sheet 1

Inventor
Arthur Claud-Mantle
By Rockwell Bartholow
Attorneys

June 30, 1942.　　　A. CLAUD-MANTLE　　　2,287,783
ASSIST CORD ASSEMBLY
Filed May 12, 1941　　　3 Sheets-Sheet 2
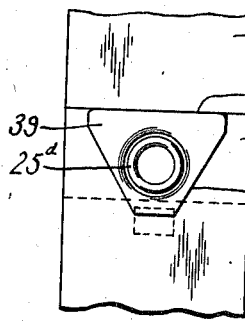
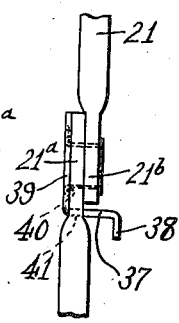
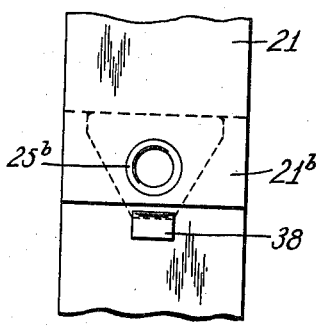
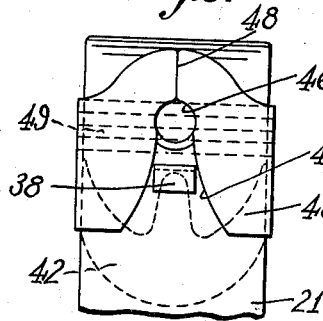
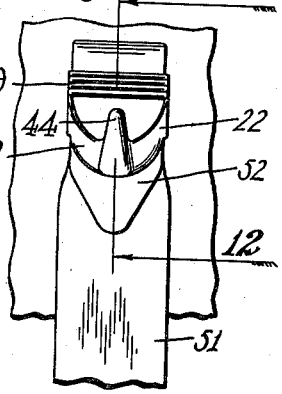
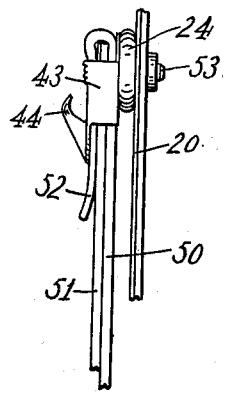
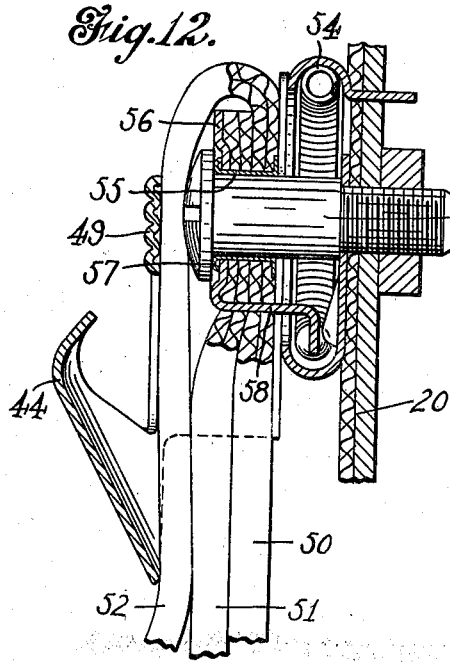
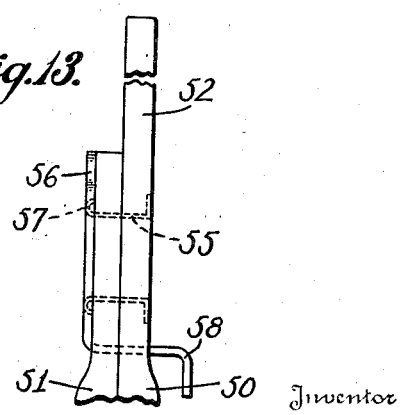
Inventor
Arthur Claud-Mantle
By Rockwell & Bartholow
Attorneys

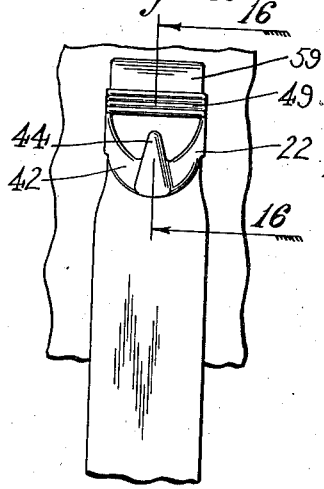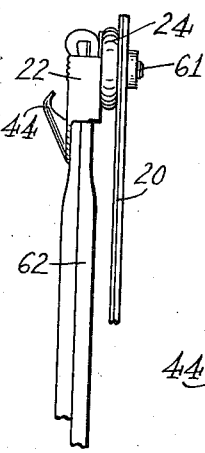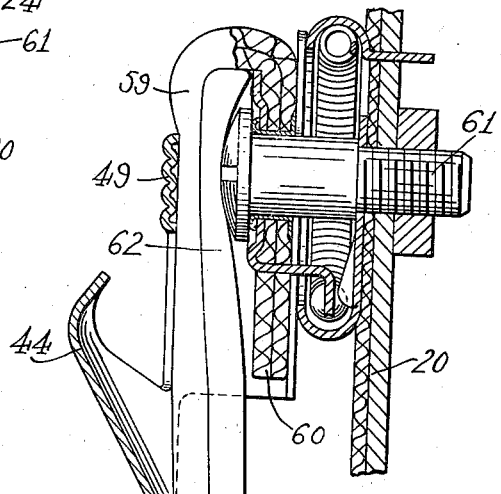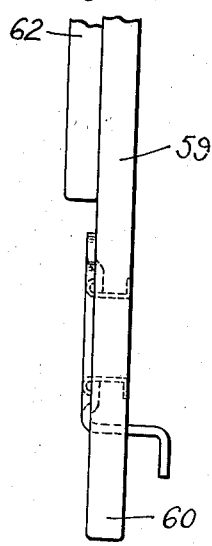

Patented June 30, 1942

2,287,783

UNITED STATES PATENT OFFICE 2,287,783

ASSIST CORD ASSEMBLY

Arthur Claud-Mantle, Trumbull, Conn., assignor to The Bassick Company, Bridgeport, Conn., a corporation of Connecticut Application May 12, 1941, Serial No. 393,052

20 Claims. (Cl. 105—354)

This invention relates to assist cords such as used in motor cars, the same being of the general type described in my copending application, Serial No. 320,390, filed February 23, 1940.

One of the objects of the invention is to provide an improved assist cord of that type in which a loop formed of flexible strap or web material is used in connection with a metal retainer or trim member, and in which the assist loop is swingable in a plane parallel to the wall on which the device is mounted.

A further object is the provision of a device of this general character having numerous advantages in use, and which nevertheless is of relatively simple and inexpensive construction.

To these and other ends the invention consists in the novel features and combinations of parts to be hereinafter described and claimed.

In the accompanying drawings:

Figs. 6, 7 and 8 are, respectively, a front, side and rear view of a portion of the rear part of the looped strap showing the plate carried thereby;

Fig. 9 is a view of the retainer and the upper part of the textile loop, showing them in assembled relation and looking from the rear;

Fig. 10 is a view generally similar to Fig. 1 showing a modified construction;

Fig. 11 is a side elevation of the structure shown in Fig. 10;

Fig. 12 is an enlarged section on line 12—12 of Fig. 10;

Fig. 13 is a side view of the upper portion of the assist loop used in this form of the device;

Figs. 14 and 15 are, respectively, a front and side elevation showing a still further modified form;

Fig. 16 is an enlarged section on line 16—16 of Fig. 14; and

Fig. 17 is a side or edge view of a portion of the strap member used with this form of the device.

Figure 1:
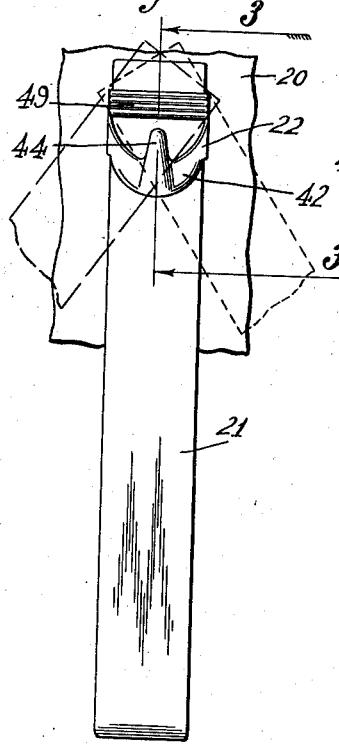
Fig. 1 is a front elevation of an assist cord assembly embodying my improvements, the car body wall being illustrated in a fragmentary manner, and the normal position of the assist member being illustrated as vertical in this particular instance.
Figure 2:
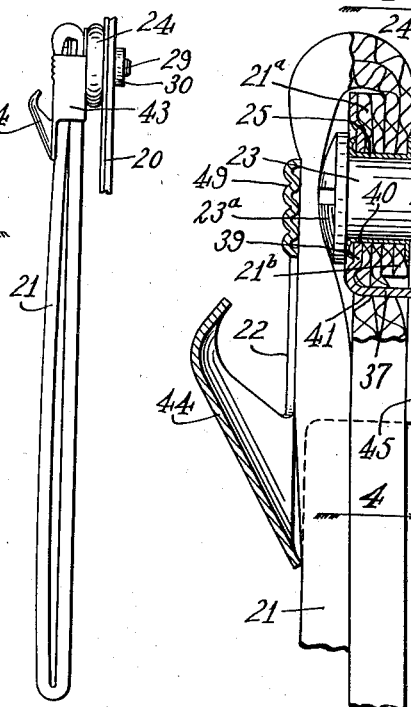
Fig. 2 is a side elevation of the parts shown in Fig. 1.

In the form of device selected for illustration in Figs. 1 to 9, inclusive, the assist member comprises a strap or web of flexible textile material formed into a permanent portable loop. For forming this loop, opposite ends of a piece of strap material are overlapped and interconnected by means including a grommet. The grommet is adapted to receive a fastener such as a screw by means of which the loop is supported to swing parallel to the supporting wall in which the screw is inserted. Back of the loop member and extending around the fastener is a case containing a spring acting on the loop member to hold it normally in a predetermined angular position. A retainer or trim member is associated with the upper suspending portion of the textile loop when the parts are in the operative or assembled position.

In the drawings, a portion of the wall of the motor car body is shown at 20, the assist loop at 21, the retainer at 22, the fastener screw at 23, and the spring case at 24. The loop 21 can be made of the usual textile web or strap material and may have the usual edge binding and other features of construction which I have not considered it necessary to illustrate. The loop is formed by cutting off a suitable length of material, looping it, slightly overlapping it at the extremities 21ª and 21ᵇ, and interconnecting the overlapped ends by stitching them together and passing therethrough a grommet 25 of a size such as to fit the smooth body or shank of the screw 23.

The spring case 24 is preferably a round case in the form of a shallow cup having an opening 26 at the rear adapted to receive a reduced portion 27 of the screw and be held against the car body wall by a shouldered portion 28 on the screw. Behind the portion 27 the screw has the threaded portion 29, which has threaded engagement in a socket on the wall formed in a suitable manner, as by welding a small interiorly threaded block 30 to the wall at the rear face of the latter.

The spring case is preferably provided in its rear wall with a struck-up tongue 31 rearwardly directed and adapted to be received in a correspondingly shaped opening 32 in the supporting wall, so as to prevent the case from rotating. At the lower part of its rear wall the case is provided with a forwardly bent lug 33. This lug is adapted to hold in an operative position a spring for controlling the swinging movement of the assist loop, and this spring is preferably constituted by a coil or helix 34 of fine wire. The spring coil when in the operative position is given a curved or arcuate shape, the form of the spring being approximately circular. It is held in this position within the case 24, which is of cup-like form, with its peripheral wall 24ª curled or curved over, so that after the spring has been compressed endwise to a certain degree and inserted into the peripheral portion of the case, it will be retained in the curved form. The extremities of the coil are shown at 35 in Fig. 4, and it will be observed that between the respective extremities and the respective ends of lug 33, small steel balls 36 are interposed.

Approximately oppositely the lug 33, a lug 37 enters the case 24 from the open front portion thereof, said lug having a down-turned end 38 which is disposed between and adapted to be engaged by the balls 36. In width the lug 37 is substantially co-extensive with the lug 33. This lug 37 is formed integrally with a plate 39 located between the front and rear portions or flaps of the textile loop. The lug 37 is struck up from the lower part of this plate, whereas the upper part of the plate acts as a stop or abutment for taking pull on the upper part of the loop, when the parts are in the assembled position. The plate 39 has a hole 40 which permits it to be fitted nicely around the grommet 25, and it is clinched to the strap by the front flange 25ª of the grommet. At the rear the grommet has a flange 25ᵇ clinched against the rear face of the strap. The lug 37 passes through a slot 41 cut through the rear portion of the textile loop, and passes rearwardly into the spring case with its down-turned end 38 in the location previously described.

It will be seen that the construction above described provides for the swinging movement of the textile loop parallel to the supporting wall, with the fastener screw acting as a pivot. The grommet, clinched to the assist loop, is free to turn on the cylindrical body portion of the screw behind the screw head 23ª, the rear face of which head substantially abuts the front end of the grommet. Downward pull on the outer portion or flap of the loop is taken by the straight top edge portion 39ª of the plate 39. The plate 39 may be reduced in width toward its lower end, for which purpose its side edge portions 39ᵇ may converge downwardly, as shown in Fig. 6, the lug 37 being formed at the lower end of the plate where it is of the least width. The loop can be swung on its pivot either forwardly or rearwardly, and in either case the plate lug acts on one end of the spring to compress the spring. The result is that when the assist loop is released the spring immediately returns it to the normal position. One of the advantages arising from the fact that the spring is double acting, i. e., returns the loop when the latter is swung in either direction, is that the device can be mounted and successfully used at either side of the car body behind an inclined mullion or quarterpost.

The retainer or trim member 22 is removably mounted on the upper portion of the loop in the relation shown in the drawings, and is supported by and from the screw 23. It extends about and confines the upper portion or fold of the endless loop, and at its rear portion it straddles the screw in such a manner as to derive support therefrom, while at the same time permitting the retainer to have the necessary pivotal movements for swinging with the loop member.

In the particular case illustrated, the retainer or trim member embodies a lower clip portion or keeper 42 adapted to extend over and across the outer portion or flap of the assist loop. This clip portion 42 is preferably in the form of an inverted arch having its ends curved upwardly to side walls 43 of the box-like body of the retainer. The retainer is preferably made of a single piece of sheet metal, and the clip portion 42 is preferably provided with an upwardly and outwardly directed garment hook 44, which is arched in cross section. The side walls 43 are continued integrally to form the rear wall structure 45, which rear wall structure is best shown in Fig. 9. This is a thin wall snugly engaging the rear face portion of the loop. For the purpose of enabling the retainer to be slipped over the upper end portion of the loop and engaged and supported by the screw, the wall 45 has a partly round screw-engaging opening 46. Leading to this opening from the lower end of the retainer is a flared cut-away portion 47, which enables the retainer to be centered and guided in its movement to the assembled position. For the purpose of expediting the application of the retainer to the upper part of the loop, the rear wall 45 is divided into two parts, there being a division or cut 48 in that part above the opening 46. The edges of the cut are normally held resiliently in contact with each other, but the retainer is permitted to open up or expand to a certain degree if that is necessary in fitting the retainer over the loop. The cut-away portion 47 is of such size and shape that it will enable the retainer to clear the lug 37, as indicated by the full lines in Fig. 9.

Figure 3:
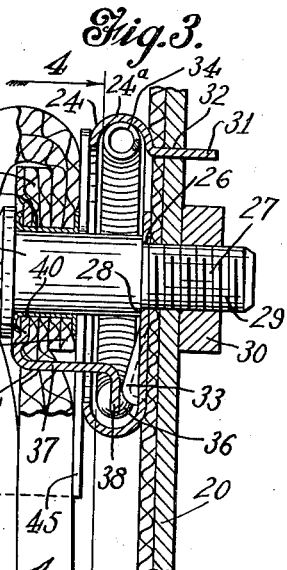
Fig. 3 is an enlarged section on line 3—3 of Fig. 1.
Figure 4:
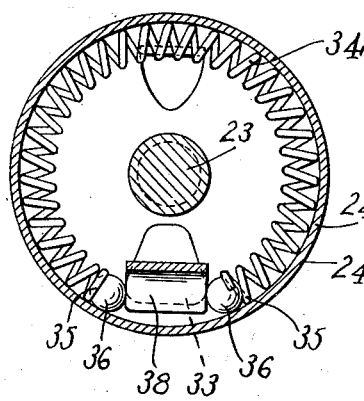
Fig. 4 is a section on line 4—4 of Fig. 3.
Figure 5:
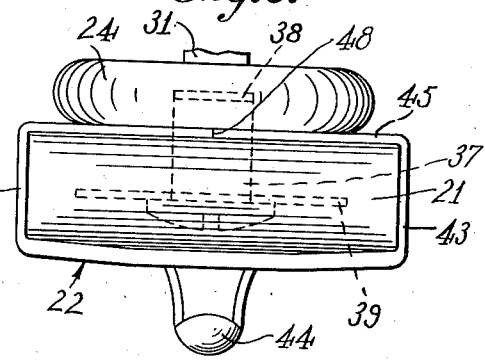
Fig. 5 is a top plan view of the parts shown in Fig. 3, certain parts being omitted.

At the upper front portion of the retainer the same is provided with a retainer member or bar 49 integral with the side walls 45 and extending horizontally across the retainer, so that it can engage and confine the front portion of the textile loop. Thus the two portions or flaps at the upper part of the loop are confined within the retainer, with the wall 45 at the rear and the bar 49 at the front. The bar 49 is preferably in approximately the same vertical plane as the clip 42, so that at the upper part the retainer is of full width. It will be noted, furthermore, that the bar 49 in the assembled position of the parts is at such a height or elevation that it is in line with the head of the fastener screw, or substantially so, as shown in Fig. 3. To permit convenient assemblage in this relation the bar 49 may initially have a slight outward bulge or bow, as shown in Fig. 5, and this will permit the front portion or flap of the loop to be properly accommodated.

It is believed that the manner of assembling the parts will be manifest from the foregoing description. The spring case with its contained spring is first placed in position against the supporting wall, and thereafter the endless loop has its rear portion directly fastened to the wall by the screw. The screw is passed through the stop plate 39 and through the spring case and screwed into its socket. A bend is usually provided in the loop immediately above the stop plate so that the front portion or flap of the loop begins adjacent that point. Thus after the operations just described the assembly is quite ready to receive the retainer. The retainer can then be very readily and conveniently fitted over the upper end portion of the loop so as to be placed in the assembled position previously described.

In the operation of the device, the stop plate 39 takes the pull on the upper part of the loop, this pull being transmitted directly to the strong and substantial fastener screw. The retainer swings on the screw as the loop is swung in one or the other direction, and it is firmly positioned and will not be dislocated in any ordinary use, although it can be readily detached if and when that is desired. The retainer extends about both flaps at a level substantially in line with the screw, and holds the textile material neatly in position with the flaps close together. The retainer also acts as a trim member and adds to the attractive appearance of the device.

In the form shown in Figs. 10 to 13, inclusive, a retainer member 22, identical with that above described, is used in connection with an assist loop of another type. Here the loop, instead of being of the continuous or endless type, comprises front and rear portions which are fastened together in face-to-face arrangement, the rear portion being continued to provide an overhanging end or tab, the tab being at the front of the loop. In this form of the device the rear flap is indicated at 50, the front flap at 51, and the tab at 52. The fastener screw is shown at 53, and the spring mechanism at 54, these being similar to parts previously described. The upper ends of the flaps 50 and 51 are interconnected by a grommet 55, as shown in Figs. 12 and 13. A stop plate 56, similar to the plate 39 previously described, is placed against the front face of the upper portion of the front flap 51, and is clinched thereto by the front end flange 57 of the grommet. This plate 56 cooperates with the spring mechanism 54 in the manner previously described, having a lug 58 which in this case passes through slots formed in two portions or plies of the loop. The tab portion 52 of the loop extends upwardly from the rear flap and forwardly and downwardly over the front flap to a certain extent. The retainer 22 is fitted over the upper end of the loop substantially in the manner previously described, but in this case it confines three plies or layers, namely, the front flap, the back flap, and the tab.

In the form shown in Figs. 14 to 17, inclusive, the construction is similar to that just described, but in this case the tab is arranged at the rear of the loop rather than at the front. Therefore, the tab is confined by the rear portion of the retainer rather than the front portion. In this case the tab is integral with the front portion or flap of the loop. The bar 49 of the retainer extends across the upper portion 59 of the front flap. The tab 60 is in the rear portion of the retainer, and is held in place by the fastener screw 61. The rear flap is shown at 62. Fig. 17 shows a portion of the strap in straightened condition as it appears before being folded over to the position of Fig. 16.

While I have shown several different embodiments of the invention, it is to be understood that many other embodiments are possible, and that various modifications and changes in the details can be made without departing from the principles of the invention or the scope of the claims.

What I claim is:

1. In an assist cord assembly, a flexible looped strap having a grommet extending through at least one of its side portions, a plate for taking pull on a part of the strap attached to the upper portion of the strap by the grommet and having a hole for a fastener screw, a screw passing through said hole and through at least a portion of the strap for pivotally mounting the loop member on a supporting wall, and a retainer removably associated with the upper end portion of the loop and holding the upper portion of the loop adjacent the screw in place.

2. In an assist cord assembly, a flexible looped strap having a grommet extending through at least one of its side portions, a plate for taking pull on a part of the strap attached to the upper portion of the strap by the grommet and having a hole for a fastener screw, a screw passing through said hole and through at least a portion of the strap for pivotally mounting the loop member on a supporting wall, and a retainer removably associated with the upper end portion of the loop and holding the upper portion of the loop adjacent the screw in place by confining it from the front as well as from the rear.

3. In an assist cord assembly, a flexible looped strap having a grommet extending through at least one of its side portions, a plate for taking pull on a part of the strap attached to the upper portion of the strap by the grommet and having a hole for a fastener screw, a screw passing through said hole and through at least a portion of the strap for pivotally mounting the loop member on a supporting wall, and a retainer removably associated with the upper end portion of the loop and holding the upper portion of the loop adjacent the screw in place by confining it from the front as well as from the rear, the confining from the front being provided by a bar extending across the retainer and located at substantially the same height as the screw.

4. An assist cord assembly such as set forth in claim 3, in which the rear wall of the retainer straddles the screw so as to be supported thereby.

5. An assist cord assembly such as set forth in claim 3, in which the rear wall of the retainer has a notchlike opening for engaging the screw and is provided with a cut or division line above the opening.

6. In an assist cord assembly, a flexible looped strap having a grommet extending through at least one of its side portions, a plate for taking pull on a part of the strap fixed to one of the side portions of the strap and having an opening for a fastener screw, a screw passing through said opening and through at least a part of the strap for pivotally connecting the loop member to a supporting wall, and a retainer removably assembled with the upper part of the loop, said retainer being movable to the assembled position from above and having a rear wall pivotally engaging the screw.

7. An assist cord assembly such as set forth in claim 6, in which the retainer has two members extending across the outer part of the loop at the outer side, one of said members being a bar at the upper end of the retainer.

8. In an assist cord assembly, a flexible looped strap having a perforation extending through at least one of its side portions, a plate for taking pull on a part of the strap having a perforation in line with said first perforation, a grommet securing the plate to the strap, a member passing through said perforations into a supporting wall for pivotally connecting the loop member to the wall for swinging movement parallel to the wall, and a trim member removably set over the upper end portion of the loop and engaging it from the front and also from the rear in the vicinity of said connecting member.

9. In an assist cord assembly, an endless strap in the form of an elongated loop, a plate for taking pull on the loop carried by said loop adjacent the upper end thereof between the front and rear portions and having an opening for a fastening screw, a screw passing through said opening and through the inner side of the loop for pivotally connecting the loop to a supporting wall, and a trim member removably associated with said loop around the upper end thereof and confining said upper end from the outside.

10. An article for use in connection with assist loops, comprising a sheet metal body having side walls, a depending front clip at the lower part thereof, a front bar interconnecting said side walls adjacent their upper ends, and a rear wall having an opening with a downwardly flaring entrance portion leading to the lower end of the rear wall.

11. An article for use in connection with assist loops, comprising a box-like sheet metal body having a depending front clip and an upper front crossbar, the portion having the crossbar being of full depth and said body having a rear wall formed to straddle a fastening screw so as to be supported thereby.

12. An article such as set forth in claim 11, in which the rear wall is formed in two parts to provide expansibility.

13. In an assist cord assembly, a flexible loop strap, a plate attached to said strap adjacent the upper end thereof and having a perforation, a screw passing through the perforation and through at least a part of the strap for pivotally connecting the loop member to a supporting wall, a spring arranged around the screw back of the loop, means of connection between said spring and said plate whereby the spring normally holds the strap in a predetermined angular position, and a trim member set over the upper portion of the strap and confining the loop member from the front as well as from the rear.

14. In an assist cord assembly, a flexible strap, a plate for taking pull on a part of the strap attached to the strap adjacent the upper end of the latter, a fastening and suspending member passing through the plate, the upper end of the strap being folded over the plate, and a retainer removably fitted over the folded-over portion of the strap and confining it from the front and rear.

15. In an assist cord assembly, a flexible strap pivoted at its upper end and continued upwardly and then forwardly and downwardly adjacent the pivot to provide a part at the upper part of the strap having at least two plies, a box-like trim member set over said upper part of the strap adjacent the pivot, and means for supporting said trim member from the pivot.

16. An assist loop member for use in connection with assist devices, comprising a flexible strap in the form of an endless portable loop, said loop having a perforation through one portion thereof by means of which it can be fastened by a suitable fastener to a supporting wall, and said loop having a stop plate supportable on the fastener and adapted for taking the pull on the upper part of the loop and permanently attached to the loop against movement longitudinally of the loop, the attachment being at that part of the loop adjacent said perforation.

17. A component of an assist device, comprising an endless flexible loop having attached thereto at the inner face of one of the loop sides a stop plate supportable on a fastener and having an upper edge which is adapted to take downward pull on the other side of the loop.

18. In an assist cord assembly, a flexible looped strap having depending front and rear portions one of which is continued at the top to form a tab overlapping the other, a plate permanently attached to the front and rear portions adjacent their upper ends and having an opening for a fastening screw, a screw passing through the front and rear portions of the loop and through said opening for pivotally connecting the loop and the plate to a supporting wall, a trim member set over the loop from the upper end and confining the loop from the outside, said trim member confining the tab as well as the front and rear portions of the loop, and a controlling spring for the loop acting against a portion of said plate.

19. In an assist cord assembly, an endless strap in the form of an elongated loop, a headed fastener passing through the inner side only of the loop and located adjacent the upper end of the loop and acting to pivot the loop to a supporting wall, a member for taking the pull on the upper part of the loop fixed on the loop to swing with it and having an opening by which it embraces the fastener, and a removable trim member confining the upper part of the loop from the outside in the vicinity of said fastener, said trim member having means at the rear portion thereof by which it is supported by said fastener.

20. In an assist loop assembly, a flexible looped strap having a grommet extending through at least one of its side portions, a screw passing through the grommet into a supporting wall and pivotally connecting the loop member with the wall, a plate for taking pull on the loop fixed to the loop adjacent the upper end of the loop and having an opening through which the screw passes, and a trim member having detachable relation to the upper end portion of the loop and having a clip extending across the outer side of the loop.

ARTHUR CLAUD-MANTLE.